United States Patent
Krohn et al.

[11] Patent Number: 5,441,297
[45] Date of Patent: Aug. 15, 1995

[54] POWER UNIT CART

[75] Inventors: Duane D. Krohn, Westminster; George R. Jones, Arvada, both of Colo.

[73] Assignee: Graco Inc., Golden Valley, Minn.

[21] Appl. No.: 150,395

[22] Filed: Nov. 10, 1993

[51] Int. Cl.⁶ .......................... B62B 1/12; B62B 1/14
[52] U.S. Cl. .................. 280/655; 280/655.1; 280/47.24; 280/47.33; 239/172
[58] Field of Search ............... 280/655, 655.1, 47.19, 280/47.24, 47.315, 47.33, 63; 239/146, 150, 172, 332, 722

[56] References Cited

U.S. PATENT DOCUMENTS

| | | | |
|---|---|---|---|
| 2,901,261 | 8/1959 | Olvey | 280/47.19 X |
| 3,940,065 | 2/1976 | Ware et al. | 239/722 X |
| 4,071,922 | 2/1978 | Davies, III et al. | 280/48.315 X |
| 4,624,602 | 11/1986 | Kieffer et al. | 239/150 X |
| 4,848,659 | 7/1989 | Tadych | 239/146 X |
| 4,865,346 | 9/1989 | Carlile | 280/655 X |
| 5,064,123 | 11/1991 | Aiello et al. | 239/146 X |

FOREIGN PATENT DOCUMENTS

| | | | |
|---|---|---|---|
| 506632 | 8/1930 | Germany | 239/146 |
| 1067114 | 10/1959 | Germany | 280/47.24 |

*Primary Examiner*—Brian L. Johnson
*Attorney, Agent, or Firm*—Palmatier, Sjoquist & Helget

[57] ABSTRACT

The power unit cart of the present invention provides for the quick, efficient, and easy replacement of either an engine or an electrical motor power unit as the power source for a cart-mounted spray painting pumping system. The power unit cart includes a main frame which has a partial tubular socket and an axial alignment member having a vertical support tab. The axial alignment member and the partial tubular socket pivotally and slidably engage a universal mounting base which includes a tubular member and an L-shaped bracket. The power unit is attached to the upper face of the universal mounting base. The axial alignment member and the partial tubular socket, in conjunction with an anchoring device, releasably and adjustably couple the universal mounting base and power unit to the power unit cart. The anchoring device is then attached to the L-shaped bracket for adjustment of the tension of a belt drive. The power unit cart also includes a belt housing having belt guides for positioning and holding of the belt drive in a desired location for convenient replacement of a power unit. The power unit cart additionally includes a pivotally-mounted, rearwardly-extending handle which may be easily manipulated in a forward direction to facilitate the replacement of a power unit.

17 Claims, 6 Drawing Sheets

5,441,297

POWER UNIT CART

BACKGROUND OF THE INVENTION

This invention relates to an improved power unit cart for transportation of either an engine or an electrical motor, and the convenient replacement thereof, for use with a spray painting pumping system. In the past, power unit carts have been limited to the exclusive use with a single power unit source. If this power unit failed, or if an alternative type of power unit was desired for a specific application, an individual was required to transport a separate power unit cart carrying the desired power unit. In the past, alternative power units were not readily transferrable between a single power unit cart.

The power unit carts as known do not provide an adjustable and convenient means for releasing the tension of a belt drive which is used to transfer power from a power unit to a spray painting pumping system. The replacement of a power unit from a power unit cart, and the manipulation or release of a belt drive, during the exchange of power units, are quite time consuming and is extremely time inefficient to an individual. Additionally, power unit carts as known do not include a belt housing for confining a belt drive in a desired position or location during the replacement of a power unit. The power unit carts as known also fail to include a pivotal handle which may be easily repositioned in order to facilitate the release, withdrawal and replacement of a power unit.

The inconvenience and loss of time resulting from manipulation of belt drives, and the extraction of a power unit, about an obstructive handle placement, are minimized by the improved power unit cart. Additionally, the power unit cart described herein provides improved flexibility and utility to an individual by facilitating the replacement of alternative power units used with a spray painting pumping system.

SUMMARY OF THE INVENTION

The power unit cart of the present invention provides for the quick, efficient, and easy replacement of either an engine or an electrical motor power unit as the power source for a cart-mounted spray painting pumping system. The power unit cart includes a main frame which has a partial tubular socket and an axial alignment member having a vertical support tab. The axial alignment member and the partial tubular socket pivotally and slidably engage a universal mounting base which includes a tubular member and an L-shaped bracket. The power unit is attached to the upper face of the universal mounting base. The axial alignment member and the partial tubular socket, in conjunction with an anchoring means, releasably and adjustably couple the universal mounting base and power unit to the power unit cart. The anchoring means is attached to the L-shaped bracket for adjustment of the tension of a belt drive. The power unit cart also includes a belt housing having belt guides for positioning and holding of the drive belt in a desired location for convenient replacement of a power unit. The power unit cart additionally includes a pivotally-mounted, rearwardly-extending handle which may be easily manipulated in a forward direction to facilitate the replacement of a power unit.

It is an object of the present invention to provide a power unit cart of relatively simple and inexpensive design, construction, and operation which is safe and which fulfills the intended purpose of transporting interchangeable power units without fear of injury to persons or damage to property. It is another object of the present invention to provide a power unit cart which facilitates the replacement of alternative power units for use with a spray painting pumping system, which eliminates the necessity for an individual to use tools during the exchange of a power unit.

It is still another object of the present invention to provide a power unit cart which simplifies the engagement of a power unit to a belt drive, and simultaneously permits convenient adjustment of the tension for the belt drive, which is used to transfer power to a spray painting pumping system.

It is still another object of the present invention to provide a power unit cart incorporating a handle which may be easily adjustably positioned for facilitating the replacement of an alternative power unit.

It is still another object of the present invention to provide a standardized universal mounting base for affixation to alternative types of power units, where the universal mounting base may be easily and conveniently coupled to a power unit cart.

It is still another object of the present invention to provide a power unit cart which positions a belt drive in a desired location during the replacement of alternative power units.

A feature of the present invention includes a lateral bracket extending between two vertical support members for positioning of a belt housing which retains a belt drive in a desired location for convenient engagement between a power unit and a spray painting pumping system.

Still another feature of the present invention includes a pivotally adjustable handle which may be easily and conveniently retracted from an operational position during the removal and replacement of a power unit from a power unit cart.

Still another feature of the present invention includes a tubular socket affixed to a main frame which provides a mechanism for the pivotal and slidable receipt of the universal base and power unit.

Still another feature of the present invention is an axial alignment member having a vertically-extending support tab which functions to position the universal base and the power unit between the vertically-extending support tab and the vertical support members of the power unit cart.

Still another feature of the present invention includes a universal base affixable to the bottom of a power unit.

Still another feature of the present invention includes a universal base having a tubular member for slidable and pivotal engagement to the tubular socket.

Still another feature of the present invention includes a universal base having an L-shaped bracket for engagement to an anchoring means for adjustably attaching a power unit to the power unit cart.

Still another feature of the present invention includes an adjustable anchoring means pivotally affixed to the axial alignment member, where the anchoring means may be rotatably tightened for adjustment of the tension of a belt drive which couples the power unit to a spray painting pumping system.

DETAILED SPECIFICATION OF THE PREFERRED EMBODIMENT

Figure 1:
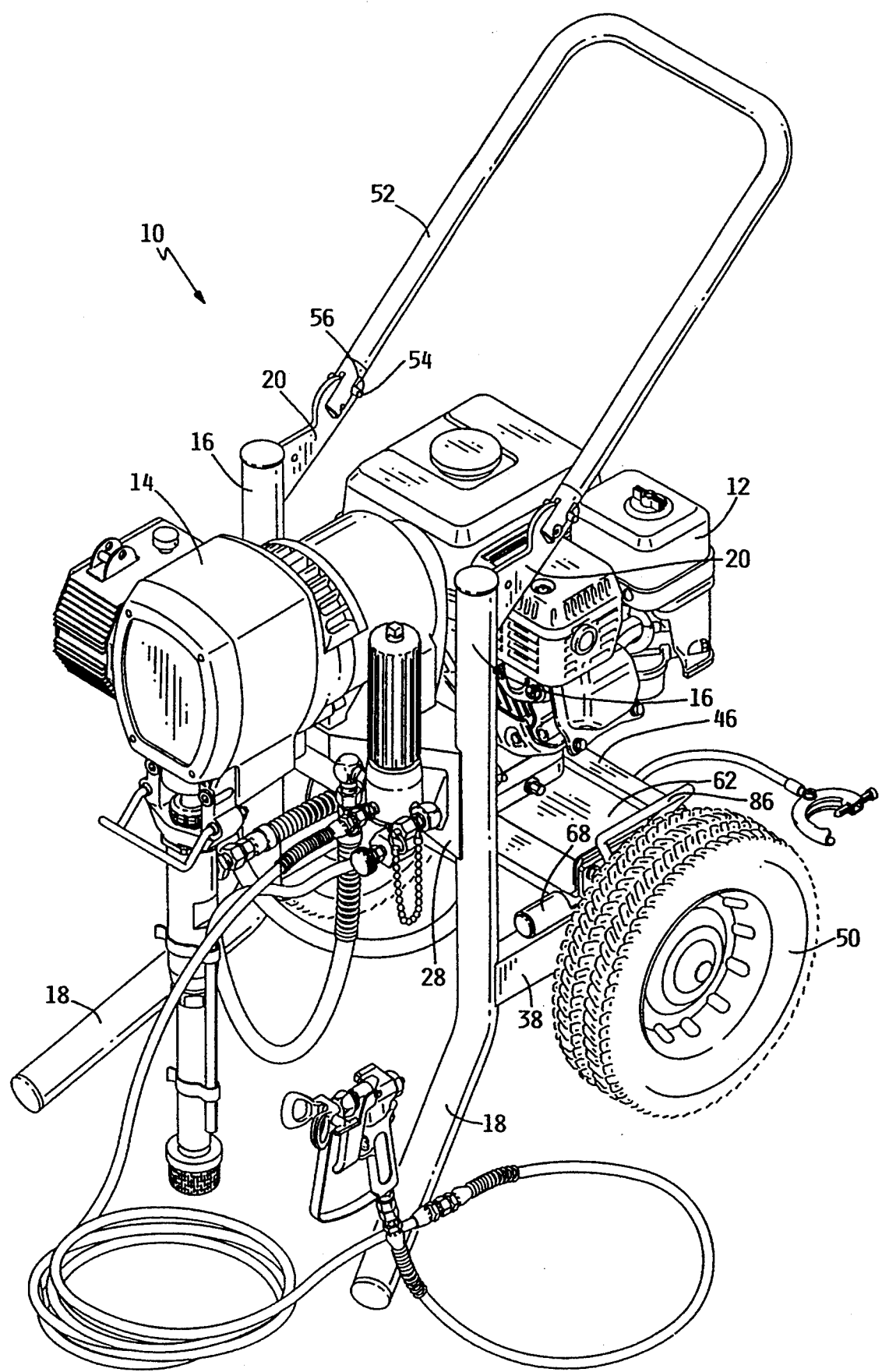
FIG. 1 is an isometric view of the invention.

One form of the invention is illustrated and described herein. The power unit cart is indicated in general by the numeral 10. The power unit is indicated by the numeral 12 and the spray painting pumping system is indicated by the numeral 14. The power unit cart 10 is used to transport a power unit 12 and a spray painting pumping system 14.

Figure 4:
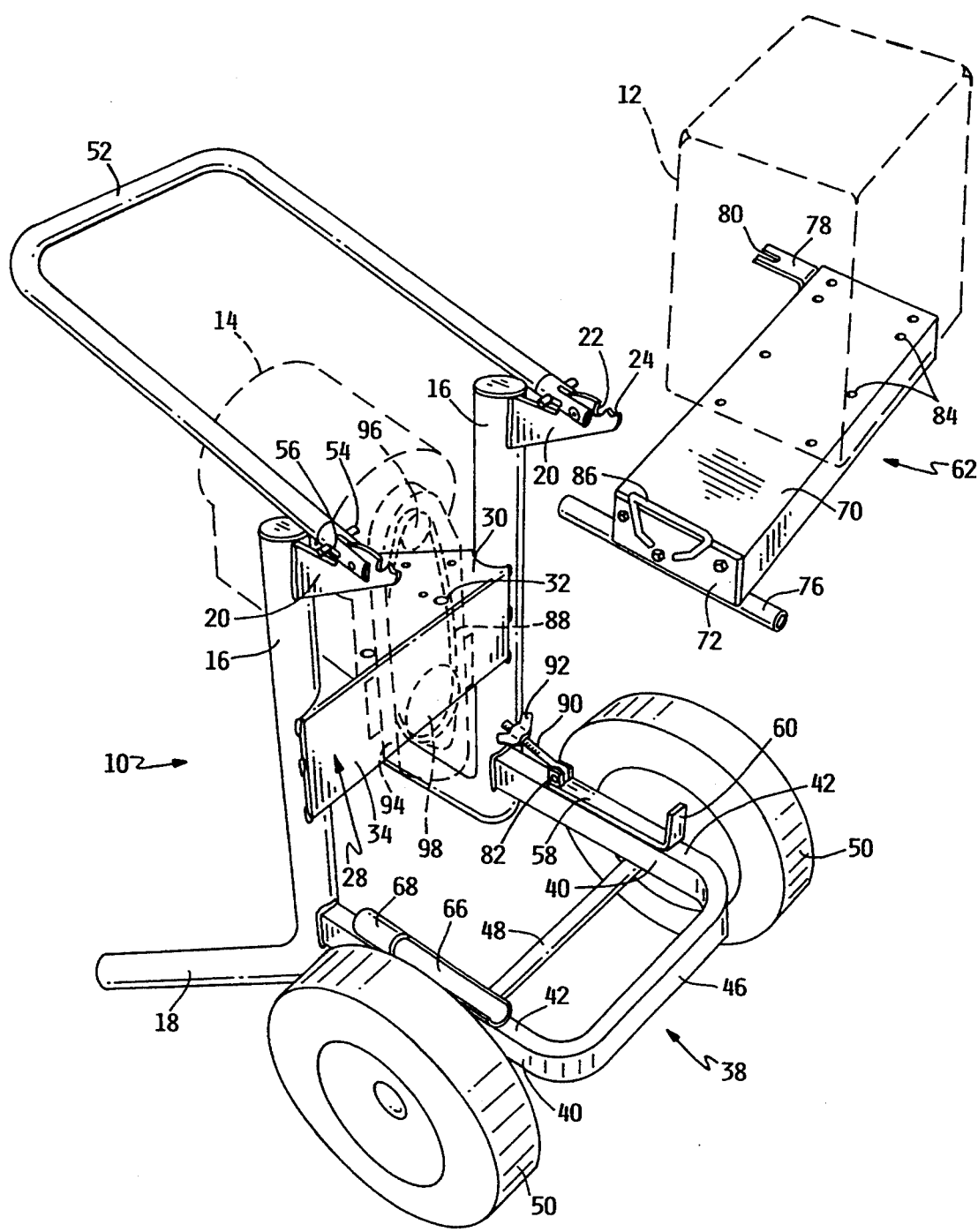
FIG. 4 is an isometric partial phantom line view of the universal mounting base separated from the power unit cart.

The power unit cart 10 includes a pair of vertical tubular supports 16. Each of the pair of vertical tubular supports 16 includes an angularly offset foot section 18 which is adapted for engagement to a ground or floor surface. Each of the pair of vertical tubular supports 16 has a preferred length dimension approximating twenty-four inches and a preferred diameter dimension approximating one and three-quarters inches. The cross-sectional shape of each of the pair of vertical tubular supports 16 is preferably circular. Alternatively, the pair of vertical tubular supports 16 may have any cross-sectional shape as preferred by an individual. Each of the pair of vertical tubular supports 16 is preferably formed of sturdy stainless steel metal material having a thickness dimension of at least one-eighth inch. The pair of vertical tubular supports 16 are of sufficient strength and durability to transport the power unit 12 and spray painting pumping system 14 without failure during use of the power unit cart 10. Alternatively, the pair of vertical tubular supports 16 may be formed of any metallic material as desired by an individual provided that the essential features, functions, and attributes described herein are not sacrificed (FIGS. 1 and 4).

Each of the angularly offset foot sections 18 preferably is formed of the same stainless steel metal material as the pair of vertical tubular supports 16. The angularly offset foot sections 18 are preferably formed by bending the pair of vertical tubular supports 16. The pair of angularly offset foot sections 18 are positioned forward of the power unit cart 10 and below the spray painting pumping system 14 (FIG. 1). Each of the angularly offset foot sections 18 preferably diverge outwardly from each other and from the power unit cart 10, thereby improving the stability of the power unit 12 and spray painting pumping system 14 during the painting of an article. The pair of angularly offset foot sections 18 may be integrally connected to a corresponding vertical tubular support 16 or may be attached thereto by any means as preferred by an individual.

Each of the pair of vertical tubular supports 16 includes a rearwardly-extending handle bracket 20. Each of the handle brackets 20 is preferably positioned upon a corresponding vertical tubular support 16 opposite to an angularly offset foot section 18. Each of the handle brackets 20 are located proximal to the top of a vertical tubular support 16, extending upwardly and rearwardly therefrom. Each of the handle brackets 20 preferably has a semi-circular engagement section, a groove 22, and a stop 24, and is formed of metal material. Each of the handle brackets 20 is preferably affixed to the corresponding vertical tubular support 16 by welding. It should be noted that any means of affixation may be used to attach the handle brackets-20 to the vertical tubular supports 16 at the preference of an individual including, but not limited to, the use of screws, nuts and bolts, and/or rivets provided that separation from the pair of vertical tubular supports 16 does not occur during use of the power unit cart 10. Alternatively, the handle brackets 20 may be formed of any material including, but not limited to, the use of metals and/or rigid plastics provided that the essential functions, features, and attributes described herein are not sacrificed. The pair of handle brackets 20 serve as a pivotal interface means between the handle 52 and the power unit cart 10 (FIGS. 1 and 4).

A lateral brace 28 is preferably affixed to, and extends between, the pair of vertical tubular supports 16. The lateral brace 28 is preferably positioned at an approximate height equal distances between the pair of handle brackets 20 and the angularly offset foot sections 18. The lateral brace 28 is preferably formed of steel metal material of the same thickness as the pair of vertical tubular supports 16 and the angularly offset foot sections 18. Alternatively, any material may be selected for the lateral brace 28 including, but not limited to, the use of other metals and/or rigid plastics provided that the essential functions, features, and attributes described herein are not sacrificed (FIG. 4).

The lateral brace 28 preferably includes a horizontal platform 30 for supporting the pumping system, with a plurality of first apertures 32 therethrough. The lateral brace 28 has a vertically-extending plate 34 which is preferably aligned between the pair of vertical tubular supports 16. The plate 34 is preferably affixed to the pair of vertical tubular supports 16 by welding. Alternatively, any means may be used to attach the lateral brace 28 to the pair of vertical tubular supports 16 including, but not limited to, the use of screws, nuts and bolts, and/or rivets provided that separation does not occur during use of the power unit cart 10 (FIG. 4).

The lateral brace 28 preferably has a width dimension approximating four and one-half inches, a length dimension approximating twelve inches, a depth dimension for the perpendicularly extending pumping system horizontal platform 80 approximating five inches, and a plate 34 length dimension approximating five inches. The dimensions indicated herein have been provided for illustrative purposes only and may be suitably varied at the discretion of an individual provided that the essential functions, features, and attributes described herein are not sacrificed.

The lateral brace 28 preferably functions to provide stability and strength to the pair of vertical tubular supports 16 and the power unit cart 10. Additionally, the lateral brace 28 functions to position the spray painting pumping system 14 upon the platform 30, and position the belt housing 94 outside the plate 34.

A U-shaped main frame 38 is preferably affixed to, and extends perpendicularly rearward from, the pair of vertical tubular supports 16. The U-shaped main frame 38 is preferably of sufficient durability to support the power unit 12 during use of the power unit cart 10. The U-shaped main frame 38 preferably includes a pair of parallel side frame arms 40 having upper surfaces 42 and lower surfaces. The U-shaped main frame 38 also has a transition arm 46 traversing between the pair of parallel side frame arms 40. The transition arm 46 is preferably perpendicular to each of the pair of parallel side frame arms 40 (FIG. 4).

Each of the pair of parallel side frame arms 40 is preferably affixed to one of the pair of vertical tubular supports 16, extending rearwardly therefrom, and is positioned proximate to an angularly offset foot section 18. The pair of parallel side frame arms 40 are preferably affixed to the pair of vertical tubular supports 16 by welding. Alternatively, the pair of parallel side frame arms 40 may be affixed to the pair of vertical tubular supports 16 by any means including, but not limited to, the use of screws, nuts and bolts, and/or rivets at the preference of an individual provided that separation therefrom does not occur during use of the power unit cart 10.

The U-shaped main frame 38 is preferably formed of a sturdy steel metal material; however, any material may be selected at the preference of an individual including, but not limited to, the use of other metals and/or rigid plastics. It should be noted that the U-shaped main frame 38 is preferably of sufficient strength and durability to not fracture, fail, break, and/or separate from the pair of vertical tubular supports 16 during the lifting and transportation of a power unit 12. The purpose of the U-shaped main frame 38 is to support the power unit 12 during use of the power unit cart 10. The U-shaped main frame 38 functions as the location for the pivotal and releasable coupling of the power unit 12 to the power unit cart 10.

An axle 48 is affixed to the lower surface of the pair of parallel side arms 40 approximately equal distances between the pair of vertical tubular supports 16 and the transition arm 46. The axle 48 is preferably affixed to the lower surface by welding; alternatively, the axle 48 may be affixed to the lower surface of the pair of parallel side arms 40 by any means including, but not limited to, the use of screws, nuts and bolts, rivets, and/or brackets. The axle 48 is preferably of sufficient length to position a pair of wheels 50 to the exterior of the U-shaped main frame 38, facilitating the convenient transportation of the power unit cart 10. The axle 48 is preferably formed of a sturdy steel metal material and has a sufficient diameter dimension for support of the power unit cart 10 and power unit 12 (FIGS. 1 and 4).

An elongate U-shaped handle 52 is preferably pivotally affixed to the pair of handle brackets 20, via an internal means for pivoting. The U-shaped handle 52 preferably extends upwardly and rearwardly from the pair of handle brackets 20, and is adapted for grasping by an individual during the relocation of a power unit 12 as carried by the power unit cart 10. The means for pivoting preferably includes a spring-loaded lock rod 54 which is preferably adapted for positioning within a channel 56. The spring-loaded lock rod 54 is adapted for locking engagement within the groove 22 of a corresponding handle bracket 20. Each spring-loaded lock rod 54 is preferably releasably coupled to a handle bracket 20 via a spring. The means for pivoting preferably secures the U-shaped handle 52 to the pair of handle brackets 20 during the relocation or transportation of a power unit cart 10. It should be noted that any alternative means for pivoting may be used at the preference of an individual. The U-shaped handle 52 is also secured to a corresponding handle bracket 20 by a bolt which permits the forward pivotal rotation and repositioning thereof. The means for pivoting preferably permits the rotational forward repositioning of the U-shaped handle 52, with respect to the pair of vertical tubular supports 16, during the exchange, replacement, and/or substitution of an engine or electrical motor as the power unit 12 (FIGS. 1 and 4).

The U-shaped handle 52 is preferably formed of steel metal material having a tubular shape. Each extension portion of the U-shaped handle 52 preferably has a length dimension approximating nineteen and one-half inches and a diameter dimension approximating one inch. The cross-bar length dimension for the U-shaped handle 52 preferably approximates thirteen inches and has a diameter dimension approximating one inch. The dimensions indicated herein for the U-shaped handle 52 may be significantly varied at the discretion of an individual.

The engagement between the U-shaped handle 52 and the pair of handle brackets 20 is of sufficient strength and durability to not fracture, bend, or fail when exposed to downward leverage forces during the raising of the angularly offset foot sections 18 from a ground or floor surface during the relocation of a power unit 12 and power unit cart 10.

An axial alignment member 58 is preferably affixed to the upper surface 42 of one of the pair of parallel side arms 40 of the U-shaped main frame 38. The axial alignment member 58 may be attached to the upper surface 42 by any means as preferred by an individual including, but not limited to, the use of welding, bolts and nuts, screws, and/or rivets.

Figure 5:
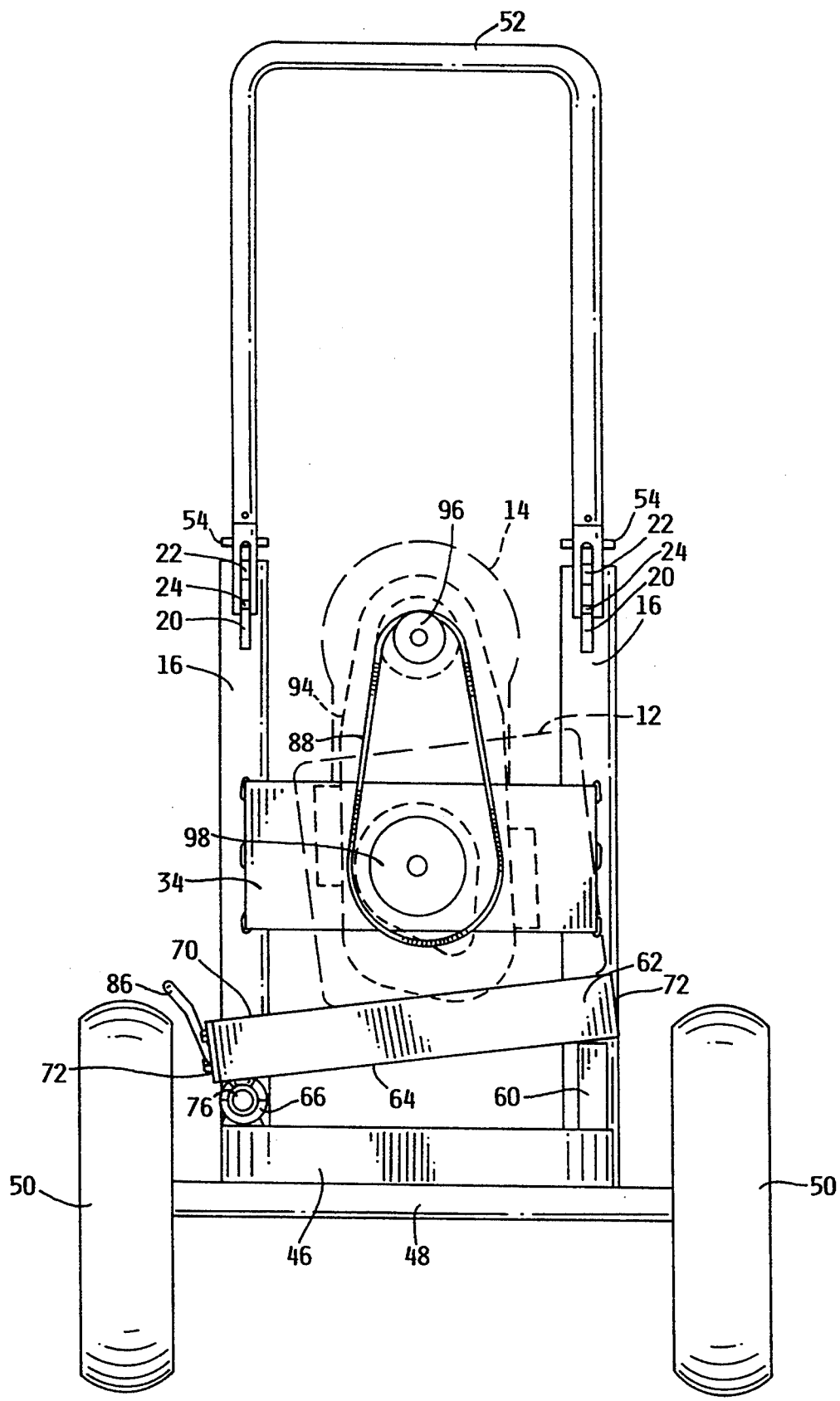
FIG. 5 is a partial phantom line elevation end view of the invention.
Figure 6:
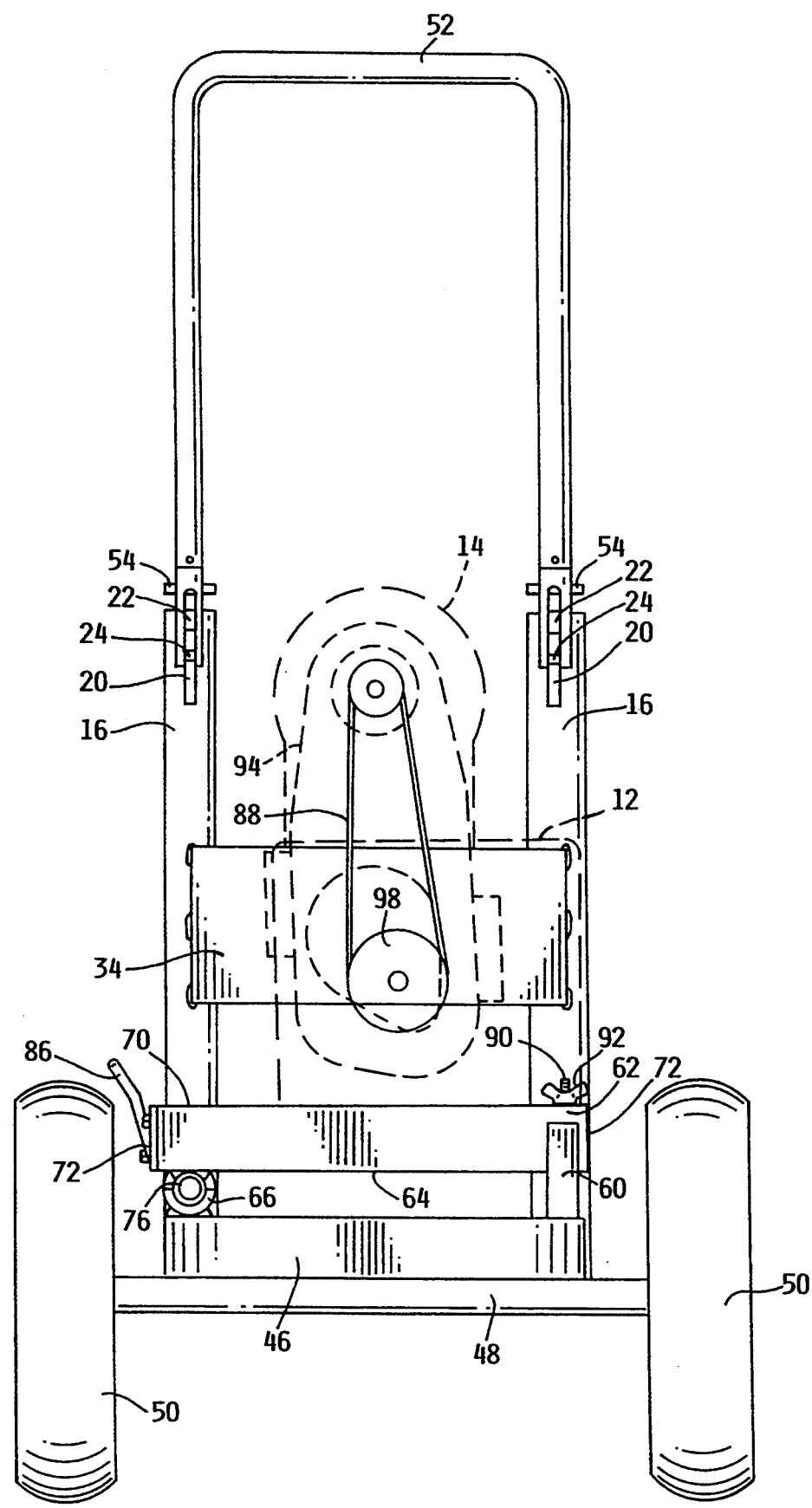
FIG. 6 is a partial phantom line elevation end view of the invention engaged to a spray painting pumping system.

The axial alignment member 58 preferably functions as a base and/or plate between the U-shaped main frame 38 and the lower face 64 of the universal mounting base 62. The universal mounting base 62, holding the power unit 12, is preferably horizontally positioned with respect to the U-shaped main frame 38 during operation of the spray painting pumping system 14. The axial alignment member 58 facilitates the horizontal positioning of the power unit 12 with respect to the power unit cart 10, and the spray painting pumping system 14 (FIGS. 4, 5 and 6).

The axial alignment member 58 preferably includes a vertical support tab 60 extending perpendicularly upward therefrom. The vertical support tab 60 is preferably positioned approximately equal distances between the pair of vertical tubular supports 16 and the transition arm 46 of the U-shaped main frame 38. The vertical support tab 60 preferably functions to position the universal mounting base 62 between the vertical support tab 60 and the pair of vertical tubular supports 16. The power unit 12, as attached to the universal mounting base 62, is then positioned proximate to the pair of vertical tubular supports 16 (FIGS. 4, 5 and 6).

The vertical support tab 60 may be formed by bending a portion of the axial alignment member 58 to an approximate angle of 90°. Alternatively, the vertical support tab 60 may be affixed to the upper surface 42, of the U-shaped main frame 38, and the axial alignment member 58, by welding. The vertical support tab 60 preferably functions to support the universal mounting base 62, and power unit 12, during the replacement of a power unit 12 upon the power unit cart 10. It should be noted that the vertical support tab 60 is preferably of sufficient strength and durability to not bend, fracture, or fail when supporting the universal mounting base 62 and power unit 12.

Figure 2:
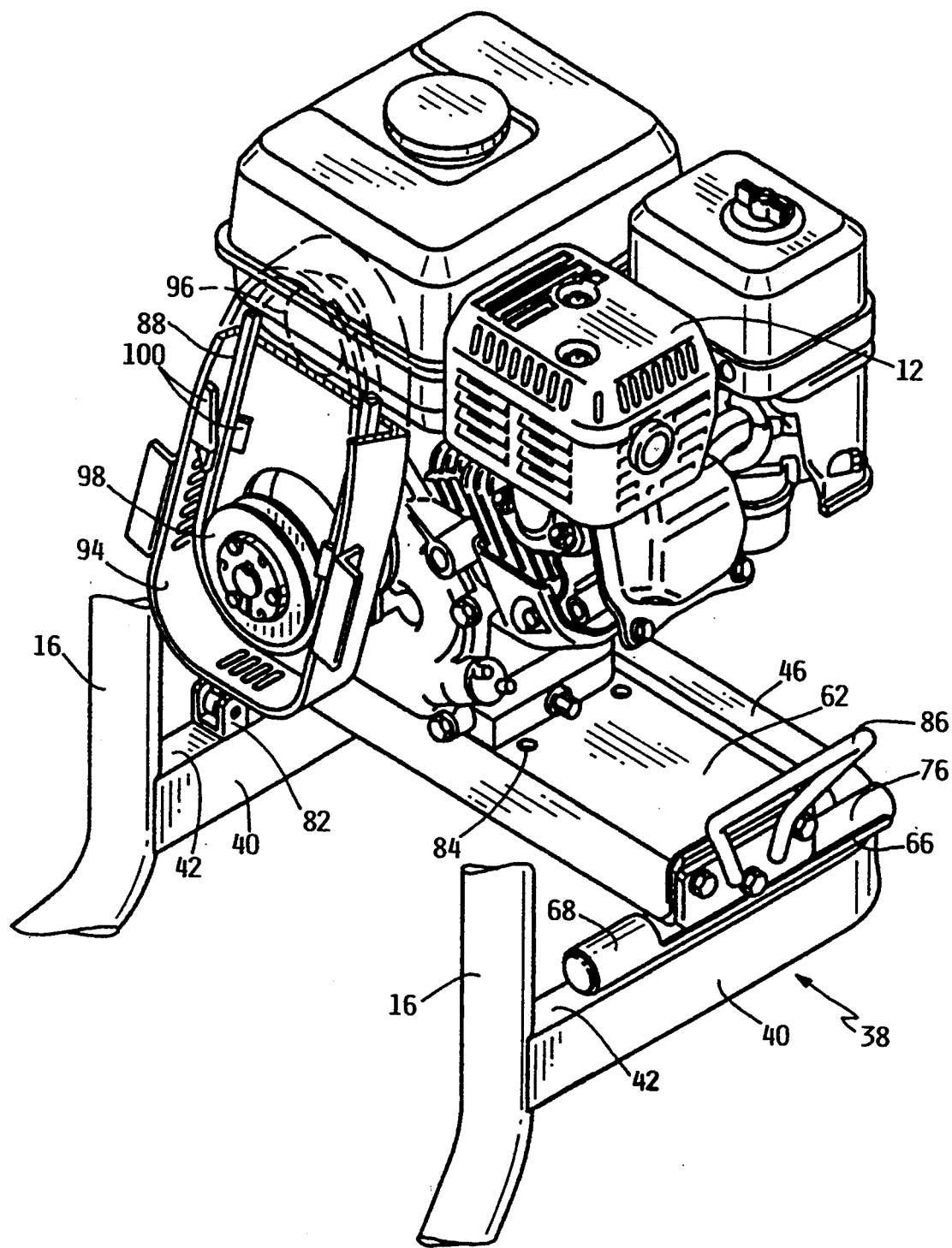
FIG. 2 is a detailed view of the belt housing, belt drive, and universal mounting base.

A partial tubular socket 66 is preferably affixed to the upper surface 42 of one of the pair of parallel side arms 40 opposite to the axial alignment member 58. The partial tubular socket 66 is preferably formed of steel metal material having a length dimension approximating eight inches, and a diameter dimension approximating one and one-eighth inches. The partial tubular socket 66 is preferably affixed to the upper surface 42 of the opposite parallel side arm 40 by welding. The partial tubular socket 66 is preferably positioned proximal to, and extends rearwardly from, the corresponding vertical tubular support 16 (FIGS. 1, 2 and 4).

The partial tubular socket 66 has a tubular portion 68 which is preferably positioned proximate to the vertical tubular support 16. The tubular portion 68 preferably has a length dimension approximating two inches. The partial tubular socket 66 is preferably semi-circular in cross-sectional shape forming a channel for the sliding lateral and pivotal receipt of the universal mounting base 62. The partial tubular socket 66 functions to releasably couple the universal mounting base 62 and the power unit 12 to the U-shaped main frame 38 (FIGS. 1, 2 and 4).

A power unit 12 is preferably attached to the upper face 70 of the universal mounting base 62. The universal mounting base 62 may be attached to either an engine or an electrical motor, which functions as the power unit 12 for a spray painting pumping system 14. The universal mounting base 62 preferably has a rectangular box-shape and includes a lower face, an upper face 70, a pair of vertical side faces 72, and a vertical rear face 74. The universal mounting base 62 is preferably formed of steel metal material having a thickness dimension of at least one-eighth inch.

A tubular member 76 is preferably mounted to the lower face of the universal mounting base 62 proximate to one of the pair of vertical side faces 72. The tubular member 76 preferably extends parallel to the corresponding vertical side face 72 extending forwardly and rearwardly from the universal mounting base 62. The tubular member 76 is preferably affixed to the lower face by welding (FIGS. 1, 2, 3 and 4).

The tubular member 76 preferably slidably engages the partial tubular socket 66 during the replacement of a power unit 12 upon a power unit cart 10. A replacement power unit 12, as affixed to the universal mounting base 62, may be attached to the power unit cart 10 by positioning of the tubular member 76 within the partial tubular socket 66. The power unit 12, and universal mounting base 62, may then rest upon the vertical support tab 60. The universal mounting base 62 and power unit 12 may then be incrementally raised from the vertical support tab 60, causing the rotational engagement of the tubular member 76 within the partial tubular socket 66. The universal mounting base 62 and power unit 12 may then be slidably manipulated in a forward direction toward the pair of vertical tubular supports 16. During the forward sliding of the universal mounting base 62 and power unit 12, a portion of the tubular member 76 penetrates within, and becomes engaged to, the tubular portion 68. Upon complete forward positioning of the universal mounting base 62, the dropping of the power unit 12 may occur, which positions the universal mounting base 62 forwardly of the vertical support tab 60. The tubular member 76 functions to interface with the partial tubular socket 66, facilitating the sliding and receiving engagement of the universal mounting base 62 for releasable coupling of the power unit 12 to the U-shaped main frame 38 (FIGS. 1, 2, 4 and 5).

An L-shaped affixation bracket 78 is preferably affixed to the vertical rear face 74 of the universal mounting base 62. The L-shaped affixation bracket 78 is preferably formed of steel metal having length and width dimensions approximating two inches. A portion of the L-shaped bracket 78 preferably extends rearwardly from the vertical rear face 74, and is positioned in an approximate horizontal plane to the upper face 70. The L-shaped affixation bracket 78 is also preferably positioned proximate to the vertical side face 72 opposite to the tubular member 76. The L-shaped affixation bracket 78 preferably includes a notch 80 which preferably has a width and depth dimension of approximately three-quarters inch.

The purpose of the L-shaped affixation bracket 78, and notch 80, is to engage the anchoring means 82 for adjustment of the horizontal positioning of the power unit 12 and universal mounting base 62, with respect to the spray painting pumping system 14.

Figure 3:
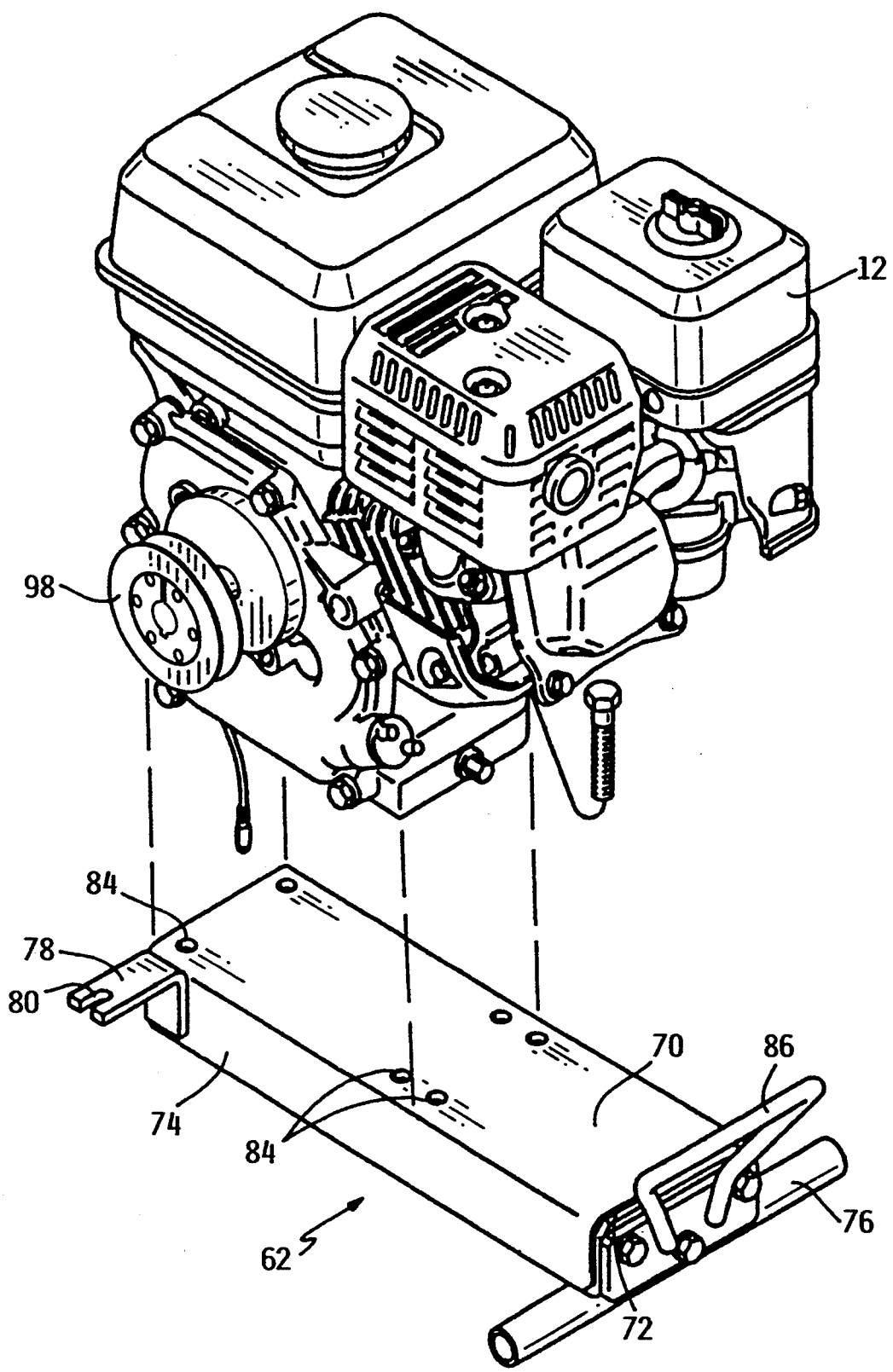
FIG. 3 is an exploded view of a power unit and the universal mounting base.

The upper face 70 and the lower face of the universal mounting base 62 preferably have a plurality of second apertures 84 therethrough. The second apertures 84 facilitate the fixed engagement between the power unit 12 and the universal mounting base 62 (FIGS. 3 and 4).

The universal mounting base 62 may also include a grasping member 86 which is preferably affixed to, and extends vertically upward from, the vertical side face 72 proximate to the tubular member 76. The grasping member 86 is preferably attached to the universal mounting base 62 by nuts and bolts. The grasping member 86 may be affixed to the universal mounting base 62 by any means including, but not limited to, the use of welding, screws, and/or rivets at the preference of an individual. Another grasping member 86 may be affixed to the vertical side face 72 proximate to the L-shaped affixation bracket 78 (FIGS. 1-6).

The grasping member 86 functions to aid an individual in the replacement of a power unit 12, and universal mounting base 62, upon the power unit cart 10. During replacement of a power unit 12 an individual may grasp the power unit 12 with one hand and the grasping member 86 with the other hand for vertical separation from the power unit cart 10. If two grasping members 86 are used, an individual may easily replace a power unit 12 upon a power unit cart 10 (FIGS. 4 and 6).

The anchoring means 82 is preferably pivotally affixed to the upper surface 42 of the parallel side arm 40 having the axial alignment member 58. The anchoring means 82 adjustably and releasably engages the notch 80 of the L-shaped affixation bracket 78 for vertical adjustment of the tension of the belt drive 88 (FIGS. 4 and 6).

The anchoring means 82 preferably includes a threaded rod 90 which is pivotally affixed to the upper surface 42 of the parallel side arm 40 by a bolt or pin. A wing nut 92 is preferably affixed to the threaded rod 90 and positioned above the notch 80. The anchoring means 82 provides for the vertical adjustment of the position of the power unit 12, as engaged to the drive belt 88, with respect to the spray painting pumping system 14. The tightening of the wing nut 92 lowers the position of the power unit 12, thereby increasing the tension upon the drive belt 88. The tension upon the belt drive 88 may be reduced by the release of the wing nut 92. The anchoring means 82 may then be disengaged from the notch 80 by the pivotal rotation of the threaded rod 90 toward the corresponding vertical tubular support 16. The anchoring means 82 is preferably securely attached to the U-shaped main frame 38 to avoid separation therefrom during the adjustment of tension upon the drive belt 88. The drive belt 88 functions to transfer power from the power unit 12 to the spray painting pumping system 14. It should be noted that any anchoring means 82 may be used by an individual for adjustable affixation of the L-shaped bracket 78 to the U-shaped main frame 38 (FIGS. 4, 5 and 6).

A belt housing 94 is preferably attached to the lateral brace 28. The belt housing 94 is preferably elongate and substantially oval in shape surrounding the drive belt 88. The belt housing 94 is preferably positioned rearward of the pair of vertical tubular supports 16 and is flushly engaged to the power unit stop 34. The belt housing 94 preferably depends from a vertical position covering a pumping system pulley 96, and extends to a lower position covering a power unit pulley 98. The belt housing 94 preferably includes a plurality of internal belt guides 100 which retain the drive belt 88 in a substantially elliptical configuration upon the disengagement of the power unit pulley 98 during replacement of a power unit 12 (FIGS. 1, 2, 4, 5 and 6).

The belt housing 94 functions to cover and protect an individual from contact with the drive belt 88, pumping system pulley 96, and power unit pulley 98 during operation of the spray painting pumping system 14. The belt housing 94 additionally serves the purpose of retaining the drive belt 88 in an elongate elliptical configuration, thereby facilitating the replacement of a power unit 12, and the engagement of a substitute power unit pulley 98. The belt guides 100 prevent the drive belt 88 from acquiring a substantially circular configuration upon the disengagement and withdrawal of a power unit pulley 98, and power unit 12, from a spray painting pumping system 14 (FIGS. 1, 2 and 4).

During replacement of a power unit 12, the fixed elliptical configuration of the drive belt 88 facilitates the receiving engagement of a substitute power unit pulley 98, via the dropping of a substitute power unit 12, and universal mounting base 62, into engagement with the partial tubular socket 66 and vertical support tab 60. The forward sliding of the power unit 12, and universal mounting brace 62, within the partial tubular socket 66, and the positioning of the universal mounting base 62 forward of the vertical support tab 60 engages the substitute power unit pulley 98 to the elliptical configuration of the drive belt 88. The lowering of the universal mounting base 62, and power unit 12, automatically engages the power unit pulley 98 to the drive belt 88. The lowering of the power unit pulley 98, as engaged to the drive belt 88, separates the drive belt 88 from the belt guides 100 within the belt housing 94 (FIGS. 5 and 6).

The fixed positioning and retention of the drive belt 88 for receiving engagement of the power unit pulley 98 eliminates the necessity for workmen to attempt to adjust the location of the power unit 12 or spray painting pumping system 14. The belt housing 94 retains the drive belt 88 in a position to facilitate the immediate dropping of a substitute power unit 12 for automatic engagement to a spray painting pumping system 14. The anchoring means 82 may then be pivoted for engagement of the wing nut 92 to the notch 80 for tightening which increases the tension upon the drive belt 88 (FIGS. 5 and 6).

The replacement of a power unit 12 may occur by the release of the wing nut 92 and the pivotal rotation of the anchoring means 82 toward the corresponding vertical tubular support 16. The universal mounting base 62 may then be elevated for positioning upon the vertical support tab 60, which in turn causes the pivotal rotation of the tubular member 76 within the partial tubular sockets 66. The vertical elevation of the power unit 12 disengages the power unit pulley 98 from the drive belt 88. The belt guides 100 and belt housing 94 retain the drive belt 88 in a substantially elongate elliptical configuration for future automatic receipt of a substitute power unit pulley 98. The power unit 12 and universal mounting base 62 may then be slid rearwardly with respect to the U-shaped main frame 38, via the partial tubular socket 66. The universal mounting base 62 and power unit 12 may then be vertically disengaged from the power unit cart 10. A substitute power unit 12 and universal mounting base 62 may then be positioned within the power unit cart 10. It should be noted that during operation of the spray painting pumping system 14 that the drive belt 88 does not engage the interior of the belt housing 94 or the belt guides 100. It should also be noted that during replacement of a power unit 12, the U-shaped handle 52 is pivotally rotated in a forward direction for repositioning to a location forward of the spray painting pumping system 14. Interference of the handle 52 during the replacement of a power unit 12 is thereby eliminated.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed is:

1. A power unit cart for carrying a power unit comprising:
   a) a vertical frame having foot sections and handle brackets;
   b) a support frame affixed to, and extending from, said vertical frame, said support frame having parallel side arms, said parallel side arms having upper and lower surfaces;
   c) an axle affixed to, and traversing between, said lower surface of said parallel side arms, said axle having a pair of wheels;
   d) a handle affixed to, and extending from, said handle brackets;
   e) a mounting base affixable to said power unit, said mounting base having an elongate slide and an L-shaped bracket;
   f) an axial alignment member affixed to said upper surface of one of said parallel side arms, said axial alignment member having a vertical support tab for positioning of said mounting base and said power unit between said vertical frame and said vertical support tab;
   g) a socket affixed to said upper surface of one of said parallel side arms opposite to said axial alignment member, said socket for sliding and pivotal receipt of said elongate slide for releasably coupling said mounting base and said power unit to said support frame;
   h) an anchoring means pivotally affixed to said upper surface of said parallel side arm proximate to said axial alignment member, said anchoring means for releasably engaging said L-shaped bracket; and i) a belt housing affixed to said vertical frame, said belt housing having a plurality of belt guides for positioning of a drive belt for engagement to said power unit.

2. A power unit cart for carrying a power unit comprising:

a) a pair of vertical supports having forwardly-extending foot sections, each of said vertical supports further having a rearwardly-extending handle bracket;

b) a main frame affixed to and extending rearwardly from said pair of vertical supports proximate to said forwardly-extending foot sections, said main frame having parallel side arms, said parallel side arms having upper and lower surfaces;

c) an axle affixed to, and traversing between, said lower surface of said parallel side arms, said axle having a pair of wheels;

d) a handle having a means for pivoting engaged to said handle brackets, said means for pivoting providing rotational movement of said handle with respect to said pair of vertical supports;

e) a mounting base affixable to said power unit, said mounting base having a lower face, an upper face, a pair of side faces, and a rear face, said mounting base further having an elongate slide affixed to said lower face proximate to one of said side faces and an L-shaped bracket attached to, and extending rearwardly from, said rear face proximate to said other side face and proximate to said upper face, said power unit being affixed to said upper face;

f) an axial alignment member affixed to said upper surface of one of said parallel side arms, said axial alignment member having a vertical support tab for positioning of said mounting base and said power unit between said pair of vertical supports and said vertical support tab;

g) a socket affixed to said upper surface of one said parallel side arms opposite to said axial alignment member, said socket for sliding and pivotal receipt of said elongate slide for releasably coupling said mounting base and said power unit to said main frame;

h) an anchoring means pivotally affixed to said upper surface of said parallel side arm proximate to said axial alignment member, said anchoring means for releasably engaging said L-shaped bracket; and i) a belt housing affixed to, and positioned rearwardly of, said pair of vertical supports, said belt housing having a plurality of belt guides for positioning a drive belt for engagement to said power unit.

3. The power unit cart according to claim 2, wherein said vertical supports are tubular in shape and said forwardly-extending foot sections are angularly offset with respect to said vertical supports.

4. The power unit cart according to claim 3, wherein each of said handle brackets has a groove and a stop.

5. The power unit cart according to claim 4, further comprising a lateral brace affixed to and extending between said pair of vertical supports, said lateral brace being positioned between said handle brackets and said forwardly-extending foot sections, said lateral brace having a plurality of first apertures therethrough.

6. The power unit cart according to claim 5, wherein said main frame is U-shaped.

7. The power unit cart according to claim 6, wherein said handle is U-shaped and said means for pivoting is positioned within the interior of said handle, said handle extending upwardly and rearwardly from said handle brackets where said means for pivoting provides rotational forward movement of said handle with respect to said pair of vertical supports.

8. The power unit cart according to claim 7, wherein said elongate slide is tubular in shape and said L-shaped bracket has a notch for receiving adjustable engagement of said anchoring means.

9. The power unit cart according to claim 8, wherein said upper face and said lower face of said mounting base have a plurality of aligned second apertures therethrough for attaching said power unit to said upper face of said mounting base.

10. The power unit cart according to claim 9, further comprising an upwardly-extending grasping member affixed to said side face proximate to said tubular member.

11. The power unit cart according to claim 10, wherein said axial alignment member is a plate having a width dimension equal to or smaller than the dimension of said upper surface of one of said side arms.

12. The power unit cart according to claim 11, wherein said vertical support tab has a vertical dimension equal to or greater than one-half of the vertical dimension of said pair of side faces and said rear face.

13. The power unit cart according to claim 12, wherein said socket is partially tubular in shape and is partially dissected tubular in shape.

14. The power unit cart according to claim 13, said anchoring means comprising a threaded rod pivotally affixed to said upper surface of said parallel side arm, and a fastening nut means engaged to said threaded rod for adjustably and releasably engaging said notch of said L-shaped bracket for adjustment of said drive belt.

15. The power unit cart according to claim 14, wherein said belt housing is affixed to said first apertures of said lateral brace for positioning of said belt housing rearwardly of said pair of vertical supports.

16. The power unit cart according to claim 15, said means for pivoting comprising a spring-loaded locking rod for releasable engagement to said groove of said handle brackets for releasable coupling of said handle to said handle brackets.

17. A power cart for carrying a power unit comprising:

a) a pair of vertical tubular supports having angularly offset forwardly-extending foot sections, each of said vertical tubular supports further having a rearwardly-extending handle bracket having a groove and a stop;

b) a lateral brace affixed to and extending between said pair of vertical tubular supports between said handle brackets and said angularly offset forwardly-extending foot sections, said lateral brace having a plurality of first apertures therethrough;

c) a U-shaped main frame affixed to and extending rearwardly from said pair of vertical tubular supports proximate to said angularly offset forwardly-extending foot sections, said main frame having parallel side arms positioned perpendicular to said pair of vertical tubular supports, said parallel side arms having upper and lower surfaces;

d) an axle affixed to, and traversing between, said lower surface of said parallel side arms, said axle having a pair of wheels;

e) a U-shaped handle having an internal means for pivoting engaged to said handle brackets, said handle extending upwardly and rearwardly from said handle brackets, said means for pivoting providing rotational forward movement of said handle with respect to said pair of vertical tubular supports;

f) a universal mounting base affixed to said power unit, said universal mounting base having a lower face, an upper face, a pair of vertical side faces, and a vertical rear face, said universal mounting base further having a tubular member affixed to said lower face proximate to one of said vertical side faces, and an L-shaped affixation bracket having a notch, said L-shaped affixation bracket being attached to and extending rearwardly from said vertical rear face proximate to said other vertical side face and to said upper face, said upper face and said lower face having a plurality of aligned second apertures therethrough for attaching said power unit to said universal mounting base;

g) an axial alignment member affixed to said upper surface of one of said parallel side arms, said axial alignment member having a vertical support tab for positioning said universal mounting base and said power unit between said pair of vertical tubular supports and said vertical support tab;

h) a partial tubular socket affixed to said upper surface of one of said parallel side arms opposite to said axial alignment member, said partial tubular socket for sliding lateral pivotal receipt of said tubular member of said universal mounting base for releasably coupling said universal mounting base and said power unit to said U-shaped main frame;

i) an anchoring means pivotally affixed to said upper surface of said parallel side arm proximate to said axial alignment member for adjustably and releasably engaging said notch of said L-shaped affixation bracket for vertical adjustment of a belt drive; and j) a belt housing affixed to said first apertures of said lateral brace and positioned rearward to said pair of vertical tubular supports, said belt housing having a plurality of internal belt guides for positioning and holding of said drive belt for engagement to said power unit.

* * * * *